(12) United States Patent
Kakinuma

(10) Patent No.: US 12,365,162 B2
(45) Date of Patent: Jul. 22, 2025

(54) RESIN SHEET

(71) Applicant: DISCO CORPORATION, Tokyo (JP)

(72) Inventor: Yoshinori Kakinuma, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 128 days.

(21) Appl. No.: 18/513,939

(22) Filed: Nov. 20, 2023

(65) Prior Publication Data

US 2024/0181746 A1    Jun. 6, 2024

(30) Foreign Application Priority Data

Dec. 1, 2022    (JP) ................................ 2022-192602

(51) Int. Cl.
| | | |
|---|---|---|
| *B32B 7/06* | (2019.01) | |
| *B32B 7/12* | (2006.01) | |
| *B32B 27/08* | (2006.01) | |
| *B32B 27/32* | (2006.01) | |
| *B32B 27/36* | (2006.01) | |

(52) U.S. Cl.
CPC ................. *B32B 7/06* (2013.01); *B32B 7/12* (2013.01); *B32B 27/08* (2013.01); *B32B 27/32* (2013.01); *B32B 27/36* (2013.01); *B32B 2250/02* (2013.01); *B32B 2250/24* (2013.01); *B32B 2255/10* (2013.01); *B32B 2255/26* (2013.01); *B32B 2307/536* (2013.01); *B32B 2307/54* (2013.01); *B32B 2405/00* (2013.01)

(58) Field of Classification Search
CPC .. B32B 7/06; B32B 7/12; B32B 27/08; B32B 27/32; B32B 27/36; B32B 2250/02; B32B 2250/24; B32B 2255/10; B32B 2255/26; B32B 2307/536; B32B 2307/54; B32B 2405/00; C09J 7/20; C09J 7/40; C09J 2301/502

See application file for complete search history.

(56) References Cited

FOREIGN PATENT DOCUMENTS

| | | | | |
|---|---|---|---|---|
| EP | 1291164 A1 | * | 3/2003 | ....... B29C 45/14827 |
| JP | 2004349591 A | * | 12/2004 | ............ B32B 27/32 |
| JP | 2018195805 A | | 12/2018 | |
| JP | 2024014233 A | * | 2/2024 | |
| KR | 20180112779 A | * | 10/2018 | |

OTHER PUBLICATIONS

Machine Translation of JP_2004349591_A (Year: 2004).*
Machine Translation of JP-2024014233-A (Year: 2024).*
Machine Translation of KR_20180112779_A (Year: 2018).*

* cited by examiner

*Primary Examiner* — Patricia L. Nordmeyer

(74) *Attorney, Agent, or Firm* — GREER BURNS & CRAIN, LTD.

(57) ABSTRACT

A resin sheet has a thermocompression bonding film that is to be thermocompression bonded to a workpiece. The resin sheet includes the thermocompression bonding film that is made of resin and has one surface which is to be thermocompression bonded to the workpiece, and a resin-made protective film that has an inner surface facing the one surface, is stuck to the thermocompression bonding film in a peelable manner, and protects the one surface. At least one of the one surface or the inner surface is provided with a sticking section for sticking the thermocompression bonding film and the protective film to each other. The sticking section is disposed in a region not overlapping, in a plan view, with a predetermined region of the one surface, the predetermined region being scheduled to be thermocompression bonded to the workpiece.

6 Claims, 10 Drawing Sheets

RESIN SHEET

BACKGROUND OF THE INVENTION

Field of the Invention

The present invention relates to a resin sheet having a thermocompression bonding film that is to be thermocompression bonded to a workpiece.

Description of the Related Art

It has been proposed to stick one surface of a thermocompression bonding film that does not have a pressure sensitive adhesive layer formed of a pressure sensitive adhesive or the like but has a polyolefin-made base material layer to one surface of a workpiece such as a semiconductor wafer by thermocompression bonding (see, for example, Japanese Patent Laid-open No. 2018-195805). The use of this thermocompression bonding film has an advantage that the pressure sensitive adhesive is not left on the one surface of the workpiece when the thermocompression bonding film is peeled off therefrom.

Incidentally, for keeping clean the one surface of the thermocompression bonding film that is to be stuck to the workpiece, it is considered to provide a protective film in the mode of making contact with the one surface of the thermocompression bonding film. However, since the thermocompression bonding film exhibits a pressure sensitive adhesive property for adhesion to the workpiece by becoming flexible when heated, the thermocompression bonding film substantially does not have the pressure sensitive adhesive property at normal temperature (for example, a predetermined temperature of $5°$ ° C. to $35°$ C.). Therefore, it is difficult to stick the protective film to the thermocompression bonding film.

In view of this, it is considered, for example, to stick the protective film to the thermocompression bonding film by providing a pressure sensitive adhesive layer formed of a pressure sensitive adhesive or the like, on the whole part of one surface of the protective film. However, if the pressure sensitive adhesive on the protective film is transferred to the thermocompression bonding film at the time of peeling off the protective film from the thermocompression bonding film, there arises a problem that the pressure sensitive adhesive is transferred from the thermocompression bonding film to the workpiece when the thermocompression bonding film is peeled off after the thermocompression bonding film is stuck to the workpiece.

SUMMARY OF THE INVENTION

The present invention has been made in consideration of such a problem. Accordingly, it is an object of the present invention to secure sticking of a thermocompression bonding film and a protective film to each other to such an extent as to permit peeling, in the case of protecting one surface of the thermocompression bonding film to be stuck to a workpiece by thermocompression bonding, and to prevent transfer of a pressure sensitive adhesive from the thermocompression bonding film or the protective film to the workpiece.

In accordance with an aspect of the present invention, there is provided a resin sheet having a thermocompression bonding film that is to be thermocompression bonded to a workpiece. The resin sheet includes the thermocompression bonding film that is made of resin and has one surface which is to be thermocompression bonded to the workpiece, and a resin-made protective film that has an inner surface facing the one surface, is stuck to the thermocompression bonding film in a peelable manner, and protects the one surface. At least one of the one surface or the inner surface is provided with a sticking section for sticking the thermocompression bonding film and the protective film to each other. The sticking section is disposed in a region not overlapping, in a plan view, with a predetermined region of the one surface, the predetermined region being scheduled to be thermocompression bonded to the workpiece.

Preferably, the resin sheet is elongate, and the sticking section is disposed at each of both end parts in a width direction orthogonal to a longitudinal direction of the resin sheet.

In addition, preferably, the resin sheet is elongate, and is in a mode of being a wound body wound in multiple plies around a cylindrical core.

Besides, preferably, the sticking section has a pressure sensitive adhesive.

In addition, preferably, the sticking section has a charged region for sticking the thermocompression bonding film and the protective film to each other by an electrostatic force.

Besides, preferably, the sticking section has a region where the thermocompression bonding film and the protective film are stuck to each other by thermocompression bonding.

In the resin sheet according to one mode of the present invention, at least one of the one surface of the thermocompression bonding film or the inner surface of the protective film that is disposed in such a manner as to face the one surface is provided with the sticking section for sticking the thermocompression bonding film and the protective film to each other. The sticking section is disposed in a region not overlapping, in a plan view, with the predetermined region of the one surface of the thermocompression bonding film, the predetermined region being scheduled to be thermocompression bonded to the workpiece. Hence, sticking of the thermocompression bonding film and the protective film to each other to such an extent as to permit peeling can be secured, and transfer of the pressure sensitive adhesive from the thermocompression bonding film or the protective film to the workpiece can be prevented.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 9B is a sectional view taken along line E-E of FIG. 9A;

FIG. 9C is a sectional view taken long line F-F of FIG. 9A;

FIG. 10B is a sectional view taken along line G-G of FIG. 10A; and

FIG. 10C is a sectional view taken along line H-H of FIG. 10A.

DETAILED DESCRIPTION OF THE PREFERRED EMBODIMENTS

First Embodiment

Figure 1:
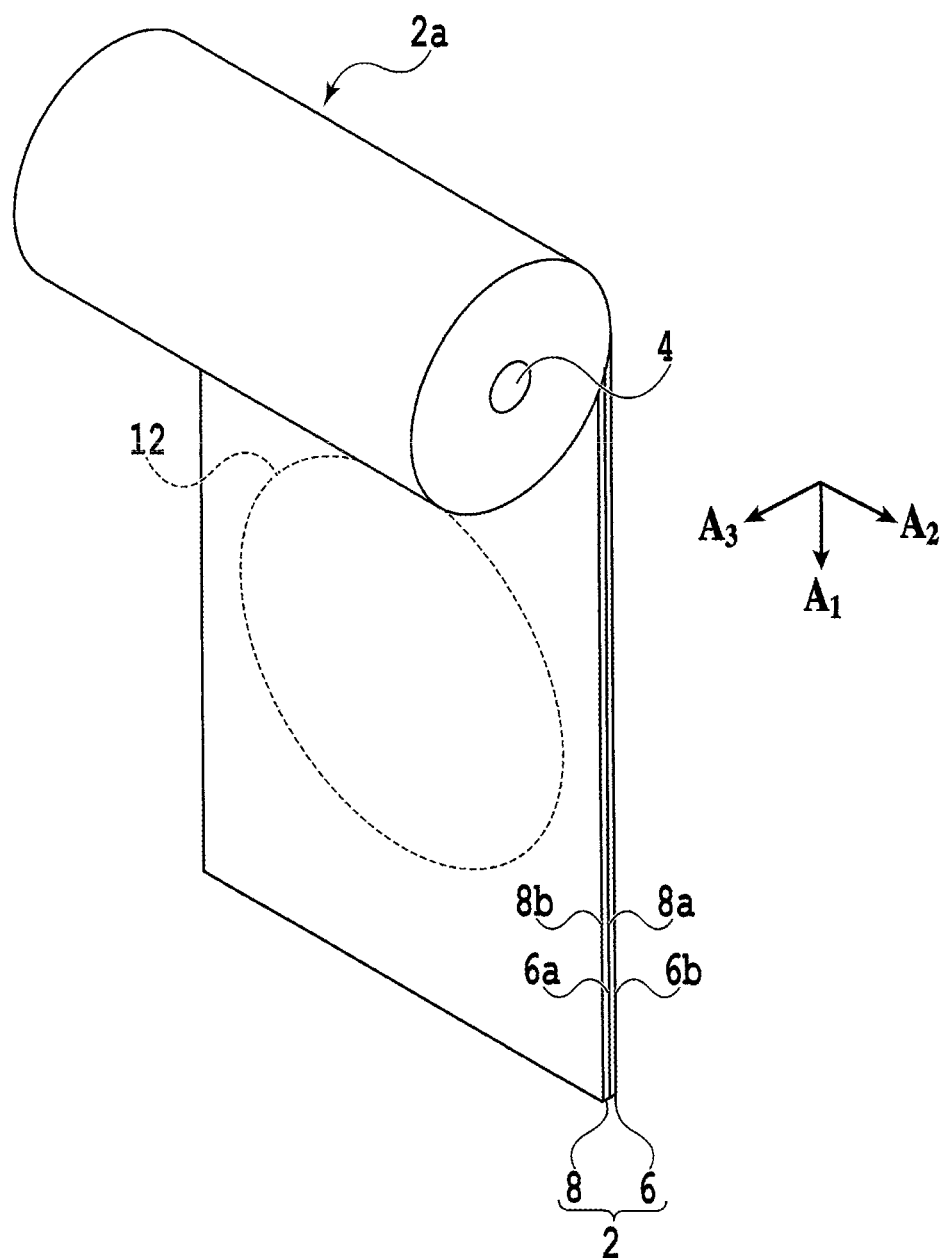
FIG. 1 is a perspective view of a wound body of a resin sheet.

An embodiment according to one mode of the present invention will be described with reference to the attached drawings. FIG. 1 is a perspective view of a wound body $2a$ of a resin sheet 2. The resin sheet 2 is conveyed in a mode of the wound body $2a$ wound in multiple plies around a cylindrical core 4 (that is, in a state of a roll), and is drawn from the wound body $2a$ when used. The core 4 is formed of, for example, rigid resin.

The diameter of the cylinder of the core 4 is, for example, 50 mm. The length of the cylinder of the core 4 is substantially the same as the width of the resin sheet 2 (that is, the length of the resin sheet 2 in a width direction $A_2$ orthogonal to a longitudinal direction $A_1$ and a thickness direction $A_3$ of the resin sheet 2). It is to be noted, however, that the length of the cylinder of the core 4 may be longer than the width of the resin sheet 2 by a predetermined length such that the core 4 projects by substantially the same length to both sides in the width direction $A_2$ of the resin sheet 2. For example, the core 4 projects by 10 mm more than the resin sheet 2 on each of one side and the other side in the width direction $A_2$.

The resin sheet 2 has a resin-made thermocompression bonding film 6 which is to be thermocompression bonded to a workpiece 11 (see FIG. 4A) which will be described later. The thermocompression bonding film 6 is formed of thermoplastic resin having a light transmitting property, and functions not as a pressure sensitive adhesive but as a base material in a normal-temperature and normal-pressure condition. The thermocompression bonding film 6 in a first embodiment is formed of a polyolefin such as polyethylene, polypropylene, poly(4-methyl-1-pentene), and poly(1-butene). It is to be noted, however, that the thermocompression bonding film 6 is not limited to the polyolefin, and may be composed of other thermoplastic resin.

As the material of the other thermoplastic resin, there can be used one or more materials selected from acrylic resin, methacrylic resin, vinyl resin, polyacetal, natural rubber, butyl rubber, isoprene rubber, chloroprene rubber, polyester such as polyethylene terephthalate and polybutylene terephthalate, polyamides such as nylon-6, nylon-66, and polymeta-xylene adipamide, polyacrylate, polymethacrylate, polyvinyl chloride, polyether imide, polyacrylonitrile, polycarbonate, polystyrene, polysulfone, polyether sulfone, polyphenylene, ether polybutadiene resin, polycarbonate resin, thermoplastic polyimide resin, thermoplastic polyurethane resin, phenoxy resin, polyamide-imide resin, fluororesin, an ethylene-unsaturated carboxylic acid copolymer, an ethylene-vinyl acetate copolymer, an ionomer, an ethylene-vinyl acetate-maleic anhydride terpolymer, a saponified ethylene-vinyl acetate copolymer, an ethylene-vinyl alcohol copolymer, and the like.

Examples of the unsaturated carboxylic acid constituting the above-mentioned ethylene-unsaturated carboxylic acid copolymer include acrylic acid, methacrylic acid, maleic acid, itaconic acid, monomethyl maleate, monoethyl maleate, maleic anhydride, and itaconic anhydride. Here, the ethylene-unsaturated carboxylic acid copolymer includes not only a bipolymer of ethylene and an unsaturated carboxylic acid but also a multi-component copolymer in which another monomer is further copolymerized.

Examples of the other monomer mentioned above which can be copolymerized in the ethylene-unsaturated carboxylic acid copolymer include vinyl ester such as vinyl acetate and vinyl propionate and unsaturated carboxylic acid ester such as methyl acrylate, ethyl acrylate, isobutyl acrylate, n-butyl acrylate, methyl methacrylate, isobutyl methacrylate, dimethyl maleate, and diethyl maleate.

It is preferable that the thermocompression bonding film 6 have a storage modulus as an index of hardness which is $1\times10^6$ Pa to $1\times10^9$ Pa at normal temperature and is $1\times10^6$ Pa to $1\times10^7$ Pa when heated. It is to be noted that the storage modulus when heated is lower than the storage modulus at normal temperature (that is, the thermocompression bonding film 6 is softer when heated). In a case where the thermocompression bonding film 6 is composed of a polyolefin, the thermocompression bonding film 6 is heated to a predetermined temperature of 80° C. to 100° C. at the time of sticking. In this instance, the storage modulus is $1\times10^6$ Pa to $1\times10^7$ Pa.

The storage modulus is measured by imparting a periodic deformation (for example, a tensile deformation) to a solid sample. The storage modulus is calculated based on a deformation amount of the solid sample and a time-basis delay until the deformation of the solid sample is generated. For example, the storage modulus is measured by a viscoelasticity measuring system DMA7100 made by Hitachi High-Tech Corporation. The measuring conditions for measuring the storage modulus by use of the system are determined, for example, as follows.

Temperature rise rate: 2° ° C./min

Measuring temperature range: room temperature to 200° ° C.

Frequency: 1 Hz

The thickness of the thermocompression bonding film 6 defined as the distance from an inner surface (one surface) $6a$ to an outer surface (the other surface) $6b$ of the thermocompression bonding film 6 is, for example, 100 μm, but the thickness of the thermocompression bonding film 6 is not limited to this numerical value. For protecting the inner surface $6a$ of the thermocompression bonding film 6 from what are generally called contaminants such as impurities or fine dust, a protective film 8 is stuck to the inner surface 6a of the thermocompression bonding film 6 in a peelable manner. An inner surface 8a of the protective film 8 made of resin faces the inner surface 6a of the thermocompression bonding film 6.

As with the thermocompression bonding film 6, the protective film 8 has a light transmitting property and functions not as a pressure sensitive adhesive but as a base material in a normal-temperature and normal-pressure condition. While the protective film 8 is formed of polyester such as polyethylene terephthalate, the protective film 8 may be formed of, among the kinds of thermoplastic resin mentioned above, thermoplastic resin which is other than the polyester.

The thickness of the protective film 8 defined as the distance from the inner surface 8a to an outer surface 8b of the protective film 8 is, for example, 100 μm, but the thickness of the protective film 8 is not limited to this numerical value. The thermocompression bonding film 6 and the protective film 8 are longer in the length in the longitudinal direction $A_1$ than the length in the width direction $A_2$ (that is, they are elongate), and are stuck to each other at a sticking section 10 (see FIGS. 2A and 2B) which will be described later.

Figure 2A:
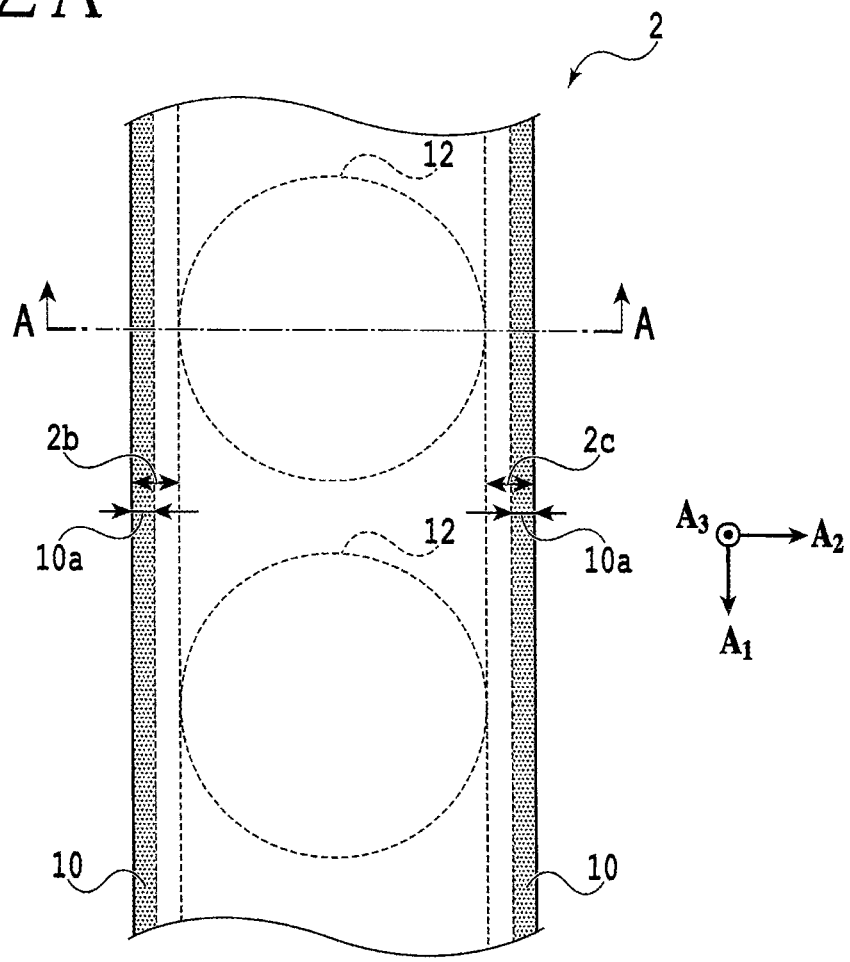
FIG. 2A is a plan view of a resin sheet according to a first embodiment.
Figure 2B:
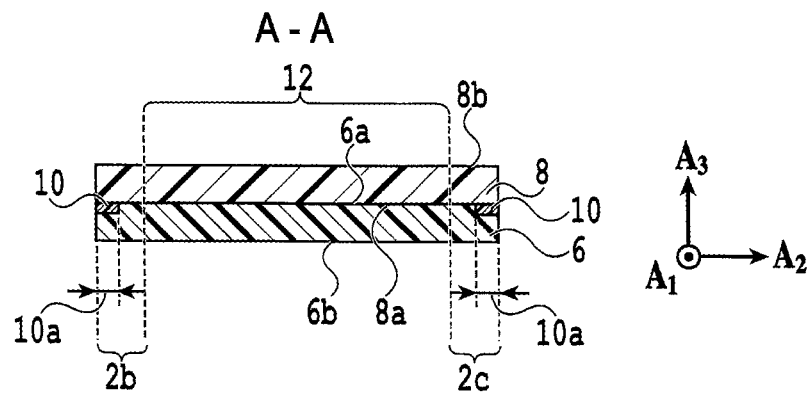
FIG. 2B is a sectional view taken along line A-A of FIG. 2A.

FIG. 2A is a plan view of the resin sheet 2 according to the first embodiment, and FIG. 2B is a sectional view taken along line A-A of FIG. 2A. In the resin sheet 2 in the first embodiment, at least one of the inner surface 6a of the thermocompression bonding film 6 or the inner surface 8a of the protective film 8 is provided with the sticking section 10 at each of both end parts in the width direction $A_2$. The sticking section 10 has an epoxy-based, acrylic-based, or rubber-based pressure sensitive adhesive that has a pressure sensitive adhesive property in normal-temperature and normal-pressure conditions. Note that, in FIG. 2A, a region where the pressure sensitive adhesive is provided is provided with a dot pattern for convenience of explanation.

The sticking section 10 is provided in substantially one half on the outer side of one side part 2b in the width direction $A_2$. In a case where the length in the width direction $A_2$ of the resin sheet 2 is 400 mm, the length in the width direction $A_2$ of the one side part 2b is approximately 35 mm, and a length 10a in the width direction $A_2$ of the sticking section 10 is approximately 17.5 mm. The sticking section 10 is similarly provided in substantially one half in the outer side of the other side part 2c in the width direction $A_2$. In a case where the length in the width direction $A_2$ of the resin sheet 2 is 400 mm, the length in the width direction $A_2$ of the other side part 2c is approximately 35 mm, and the length 10a in the width direction $A_2$ of the sticking section 10 is approximately 17.5 mm.

The sticking section 10 is provided along the longitudinal direction $A_1$ without interruption. However, by partially omitting the formation of the pressure sensitive adhesive, the sticking section 10 may have the pressure sensitive adhesive disposed periodically along the longitudinal direction $A_1$ or the pressure sensitive adhesive disposed substantially at random along the longitudinal direction $A_1$.

A circular predetermined region 12 located between the one side part 2b and the other side part 2c in a plan view of the resin sheet 2 is a region of the inner surface 6a of the thermocompression bonding film 6, the region being scheduled to be thermocompression bonded to the workpiece 11. In this example in which the length in the width direction $A_2$ of the resin sheet 2 is 400 mm, the diameter of the predetermined region 12 is 330 mm, and it is assumed that the workpiece 11 having a diameter of 300 mm is to be stuck to the predetermined region 12.

With the resin sheet 2 provided with the sticking sections 10, sticking between the thermocompression bonding film 6 and the protective film 8 to such an extent as to permit peeling can be secured. Further, each of the sticking sections 10 in the first embodiment is disposed in such a region as not to overlap with the predetermined region 12 in a plan view. Hence, even when the protective film 8 is peeled off from the thermocompression bonding film 6 and the thermocompression bonding film 6 is stuck to the workpiece 11 by thermocompression bonding, transfer of the pressure sensitive adhesive from the thermocompression bonding film 6 or the protective film 8 to the workpiece 11 can be prevented.

Figure 3:
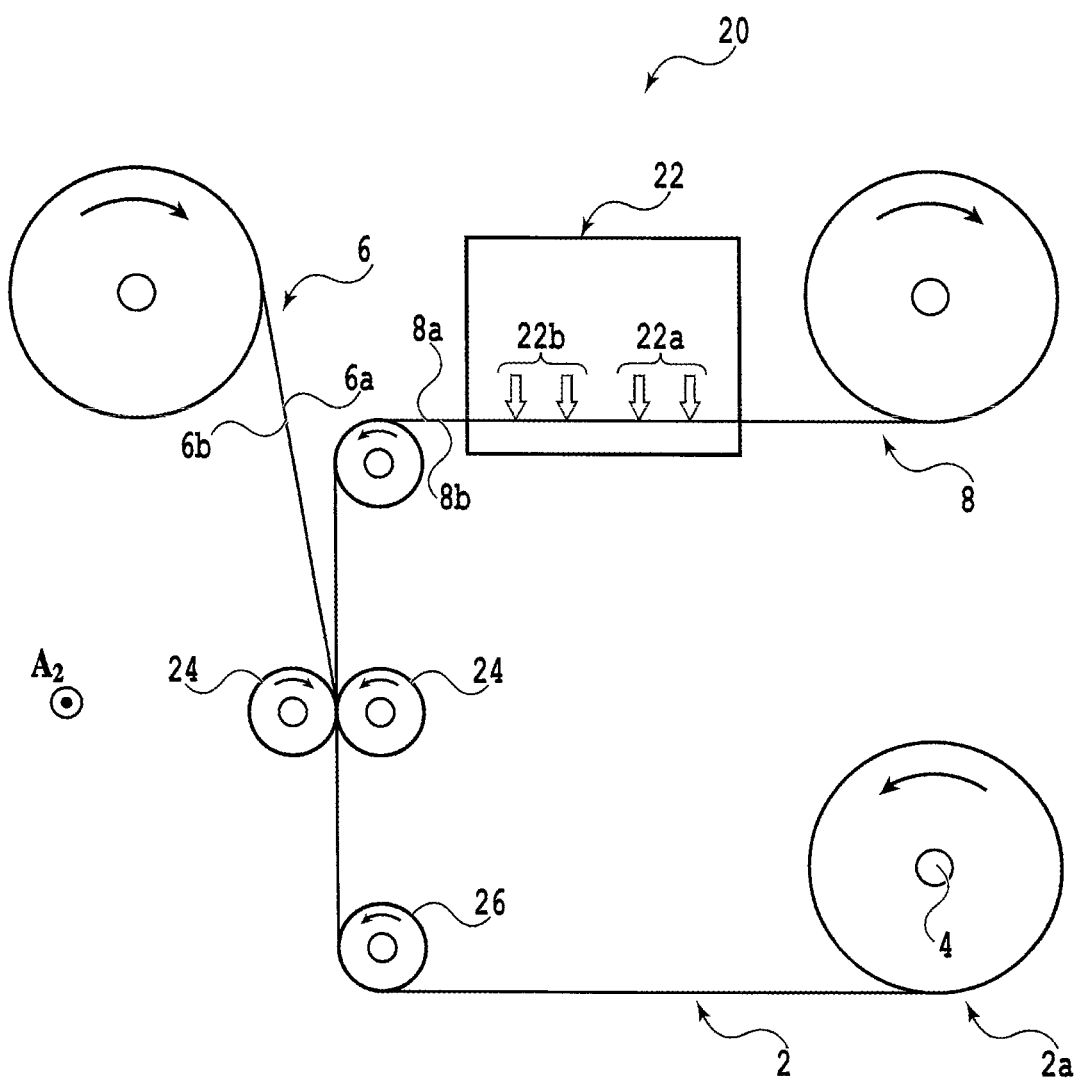
FIG. 3 is a diagram depicting an outline of an example of a method for manufacturing the resin sheet.

FIG. 3 is a diagram depicting an outline of an example of a method for manufacturing the resin sheet 2. At the time of manufacturing the resin sheet 2, the inner surface 8a of the protective film 8 is formed with the sticking sections 10 each having the pressure sensitive adhesive, and then which the inner surface 8a of the protective film 8 and the inner surface 6a of the thermocompression bonding film 6 are stuck to each other in the mode of facing each other. As depicted in FIG. 3, a manufacturing apparatus 20 has a coating and drying unit 22. The coating and drying unit 22 has a coating unit 22a that coats both end parts in the width direction $A_2$ of the inner surface 8a of the drawn protective film 8 with an organic solvent in which the pressure sensitive adhesive is dissolved.

On a downstream side of the coating unit 22a in a conveying direction in which the protective film 8 is conveyed, there is provided a drying unit 22b that dries the protective film 8 coated with the organic solvent, by heating to evaporate the organic solvent and cause the sticking sections 10 to exhibit a pressure sensitive adhesive performance. After the sticking sections 10 are formed by the coating and drying unit 22, the thermocompression bonding film 6 and the protective film 8 are stuck to each other by a pair of rollers 24 in the mode in which their inner surfaces 6a and 8a face each other, to thereby form the resin sheet 2. Then, the resin sheet 2 is passed through a roller 26 and taken up in a roll form, to thereby form the wound body 2a.

Note that, while the sticking sections 10 are formed only on the inner surface 8a of the protective film 8 in the example depicted in FIG. 3, the sticking sections 10 may be formed only on the inner surface 6a of the thermocompression bonding film 6. Instead, the sticking sections 10 may be formed on both the inner surface 8a of the protective film 8 and the inner surface 6a of the thermocompression bonding film 6. For example, the sticking section 10 is formed on each of the inner surface 8a of the protective film 8 at the one side part 2b and the inner surface 6a of the thermocompression bonding film 6 at the other side part 2c. Alternatively, the sticking section 10 may be formed on each of the inner surface 8a of the protective film 8 at the other side part 2c and the inner surface 6a of the thermocompression bonding film 6 at the one side part 2b.

Next, a method for sticking the thermocompression bonding film 6 to the workpiece 11 such as a silicon wafer by use of a sticking apparatus 30 (see FIG. 4A) will be described. The sticking apparatus 30 has a disk-shaped chuck table 32. The chuck table 32 has a holding surface 32a on which the workpiece 11 can be held under suction by a negative pressure. The chuck table 32 is configured to be movable in a predetermined direction B (see FIG. 4B) orthogonal to the width direction $A_2$ of the thermocompression bonding film 6 by a ball screw type moving mechanism (not illustrated).

On the upper side of the holding surface 32a, the wound body 2a is disposed. The resin sheet 2 drawn from the wound body 2a is separated into the thermocompression bonding film 6 and the protective film 8 at a position where a pair of guide rollers 34 are disposed, and the thermocompression bonding film 6 and the protective film 8 are each further drawn (see broken-line arrows in FIG. 4A). On the upper side of the thus drawn thermocompression bonding film 6, a cylindrical heat roller 36 for sticking the thermocompression bonding film 6 to the workpiece 11 by thermocompression bonding is provided. The heat roller 36 is disposed with its longitudinal direction set along the width direction $A_2$.

The heat roller 36 is configured to be movable in the vertical direction (that is, the direction orthogonal to the width direction $A_2$ and the predetermined direction B) by a lifting mechanism such as an air actuator and a ball screw. Inside the heat roller 36, a heat generation source (not illustrated) such as a heating wire is provided.

On the upper side of the thermocompression bonding film 6, a cutter unit 38 (see FIG. 4C) is provided. The cutter unit 38 has a cylindrical rotary shaft 38a. The rotary shaft 38a is disposed with its longitudinal direction set along the vertical direction. The rotary shaft 38a is rotated by a drive source (not illustrated) such as a motor. The rotary shaft 38a is configured to be movable in the vertical direction by a lifting mechanism such as an air actuator and a ball screw.

To a lower end part of the rotary shaft 38a, a base end part of an arm 38b disposed in such a manner as to be orthogonal to the longitudinal direction of the rotary shaft 38a is fixed. To a tip part of the arm 38b, a holder 38c is fixed. To the holder 38c, a cutting blade 38d for cutting the thermocompression bonding film 6 is fixed in such a manner as to project downward from the holder 38c.

Figure 4A:
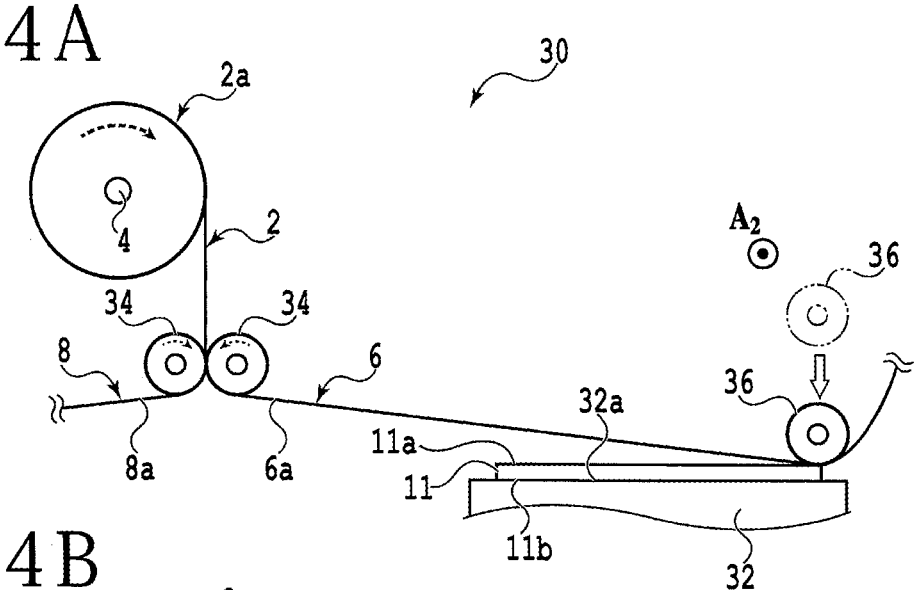
FIG. 4A is a diagram depicting a former half of a sticking step.

At the time of sticking the predetermined region 12 of the thermocompression bonding film 6 to the workpiece 11, first, as depicted in FIG. 4A, the resin sheet 2 is separated into the thermocompression bonding film 6 and the protective film 8, and thereafter, the position of the chuck table 32 in the predetermined direction B and the position of the predetermined region 12 of the thermocompression bonding film 6 are adjusted. As a result, the heat roller 36 is disposed directly above the tip part in the predetermined direction B of the workpiece 11 with a back surface 11b thereof held under suction by the holding surface 32a, with the thermocompression bonding film 6 therebetween. FIG. 4A is a diagram depicting a former half of a sticking step of sticking the thermocompression bonding film 6 to the workpiece 11.

Figure 4B:
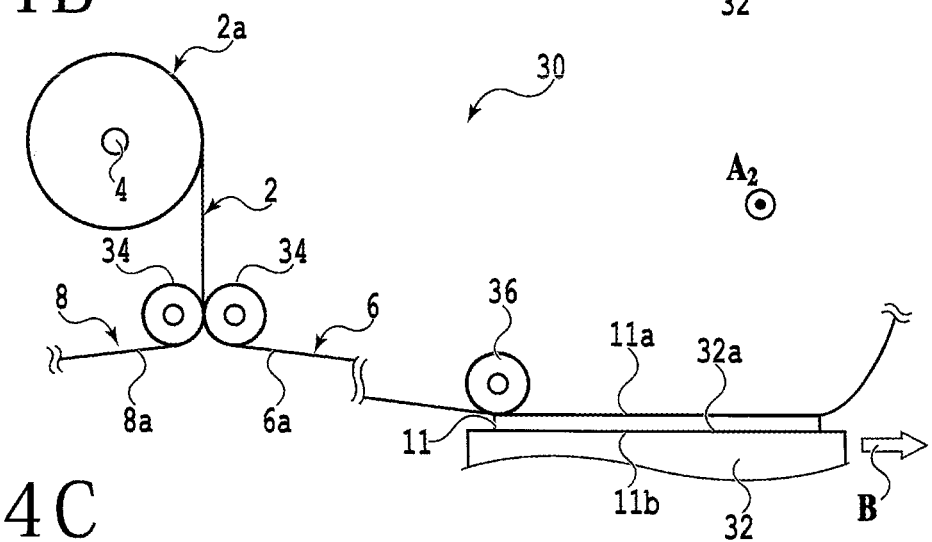
FIG. 4B is a diagram depicting a latter half of the sticking step.

Next, the heat roller 36 heated up to a predetermined temperature is pressed against the side of a front surface 11a of the workpiece 11 with a predetermined pressure, with the thermocompression bonding film 6 therebetween, and the chuck table 32 is moved along the predetermined direction B. FIG. 4B is a diagram depicting a latter half of the sticking step of sticking the thermocompression bonding film 6 to the workpiece 11.

In this example in which the thermocompression bonding film 6 is a polyolefin, the heat roller 36 is heated to a predetermined temperature of 80° ° C. to 100° C., and the pressure with which the heat roller 36 is pressed against the thermocompression bonding film 6 is set at a predetermined value of 0.3 MPa to 0.5 MPa. In addition, the moving speed of the chuck table 32 is set at a predetermined value of 10 mm/s to 30 mm/s.

As depicted in FIG. 4B, the heat roller 36 is relatively moved to a position directly above the rear end part of the workpiece 11 in the predetermined direction B, and thereafter, the movement of the chuck table 32 is stopped. Then, the heat roller 36 is moved upward, and the cutter unit 38 is moved downward to cut into the thermocompression bonding film 6.

Figure 4C:
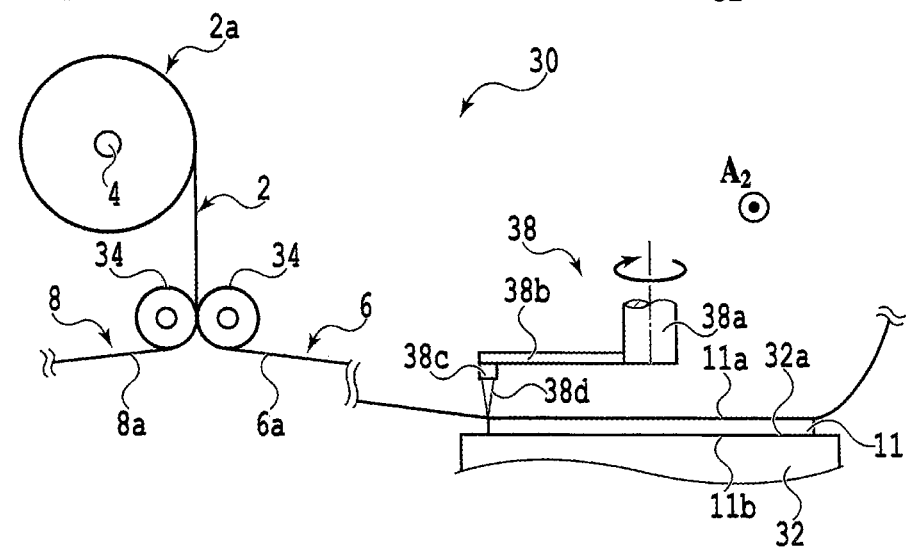
FIG. 4C is a diagram depicting an outline of a cutting-off step.

FIG. 4C is a diagram depicting an outline of a cutting-off step of cutting off the thermocompression bonding film 6 in a circular shape. In the cutting-off step, the cutting blade 38d is moved along a peripheral edge of an overlapping region of the thermocompression bonding film 6 and the workpiece 11, whereby the thermocompression bonding film 6 is cut off in a circular shape. In this way, the circular thermocompression bonding film 6 is stuck to the front surface 11a.

As has been described above, each of the sticking sections 10 in the first embodiment is disposed in a region not overlapping, in a plan view, with the predetermined region 12 of the inner surface 6a of the thermocompression bonding film 6, the predetermined region 12 being scheduled to be thermocompression bonded to the workpiece 11. Hence, sticking between the thermocompression bonding film 6 and the protective film 8 to such an extent as to permit peeling can be secured, and transfer of the pressure sensitive adhesive from the thermocompression bonding film 6 or the protective film 8 to the workpiece 11 can be prevented. Note that the chuck table 32, in place of the heat roller 36, may be heated to the above-mentioned predetermined temperature, or both the chuck table 32 and the heat roller 36 may be heated to the above-mentioned predetermined temperature. The heat of the chuck table 32 can be transmitted to the thermocompression bonding film 6 by way of the workpiece 11.

(Modification)

Figure 5A:
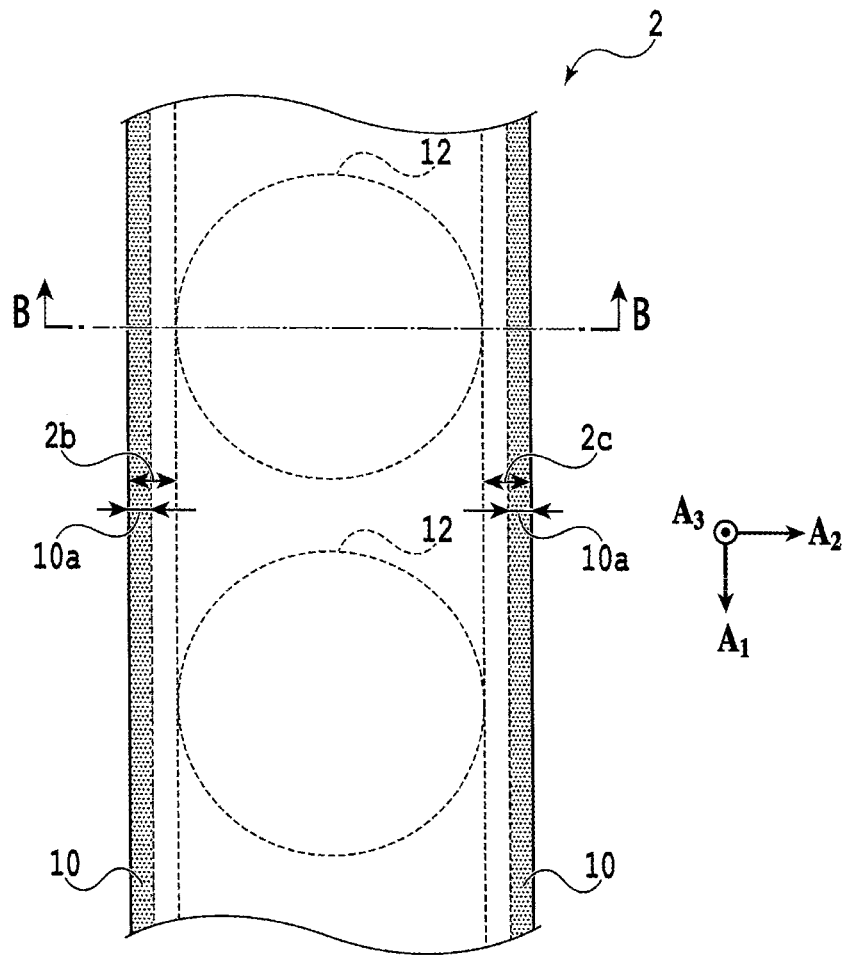
FIG. 5A is a plan view of a resin sheet according to a modification of the first embodiment.
Figure 5B:
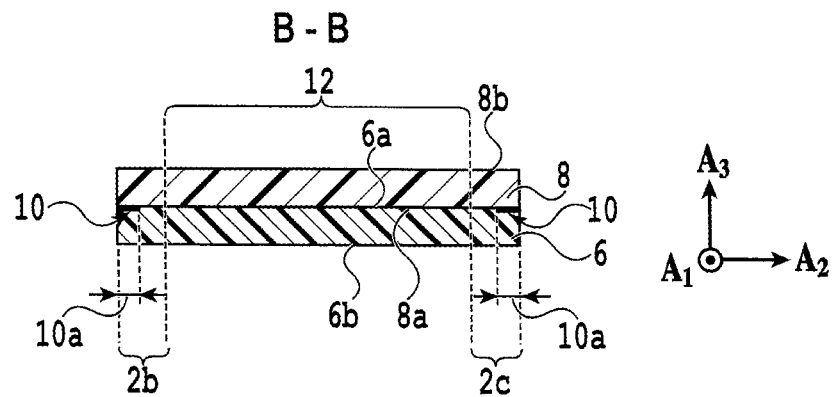
FIG. 5B is a sectional view taken along line B-B of FIG. 5A.

Next, a modification of the first embodiment will be described. FIG. 5A is a plan view of a resin sheet 2 according to the modification of the first embodiment, and FIG. 5B is a sectional view taken along line B-B of FIG. 5A. Each of sticking sections 10 in this modification has a charged region for sticking the thermocompression bonding film 6 and the protective film 8 to each other by an electrostatic force (that is, by electrostatic attraction).

The charged region can be formed, for example, by a direct-current corona discharge treatment. In order to manufacture the resin sheet 2, it is sufficient to provide a discharge treatment unit (not illustrated) in place of the coating and drying unit 22, in the manufacturing apparatus 20 depicted in FIG. 3. The discharge treatment unit includes an acicular electrode or a wire electrode, and a counter electrode.

In FIG. 5B, the charged region is expressed in bold line. As has been described above, the sticking sections 10 may be formed only on the inner surface 8a of the protective film 8, or may be formed only on the inner surface 6a of the thermocompression bonding film 6. Instead, the sticking section 10 may be formed on each of the inner surface 8a of the protective film 8 and the inner surface 6a of the thermocompression bonding film 6.

Incidentally, each of the sticking sections 10 may have a region where the thermocompression bonding film 6 and the protective film 8 are stuck to each other by thermocompression bonding, instead of the charged region. In this case, in the manufacturing apparatus 20 depicted in FIG. 3, the coating and drying unit 22 is omitted, and a heating and pressing unit (not illustrated) is provided between the pair of rollers 24 and the roller 26. In the heating and pressing unit, the thermocompression bonding film 6 and the protective film 8 are stuck to each other by thermocompression bonding at a temperature higher than the normal temperature and not higher than the temperature used in the sticking step for the thermocompression bonding film 6 and the workpiece 11, and with a pressure lower than the pressure exerted on the thermocompression bonding film 6 in the sticking step.

In the pressing unit, the thermocompression bonding film 6 is heated to a predetermined temperature of 70° C. to 100° C., preferably, a predetermined temperature of 70° C. to 90° C., and the pressure exerted on the thermocompression bonding film 6 is set at a predetermined value of 0.08 MPa to 0.15 MPa (for example, 0.1 MPa). By use of a temperature lower than that in the sticking step and a pressure lower than that in the sticking step, the thermocompression bonding film 6 and the protective film 8 can be stuck to each other in a peelable manner, while the deformation of the thermocompression bonding film 6 is restrained from reaching the predetermined region 12.

If the thermocompression bonding film 6 is peeled off from the protective film 8 after the whole part of the inner surface 6a of the thermocompression bonding film 6 and the whole part of the inner surface 8a of the protective film 8 are stuck to each other by thermocompression bonding, a wrinkle or the like is generated during peeling, and hence, the thermocompression bonding film 6 may not be stuck to the workpiece 11 with a sufficient fixing force. Hence, it is useful to dispose the sticking section 10 in a region not overlapping, in a plan view of the resin sheet 2, with the predetermined region 12 of the inner surface 6a of the thermocompression bonding film 6, the predetermined region 12 being scheduled to be thermocompression bonded to the workpiece 11. Note that the modification of the first embodiment is the same as the first embodiment except for the configuration of the sticking section 10.

Second Embodiment

Figure 6A:
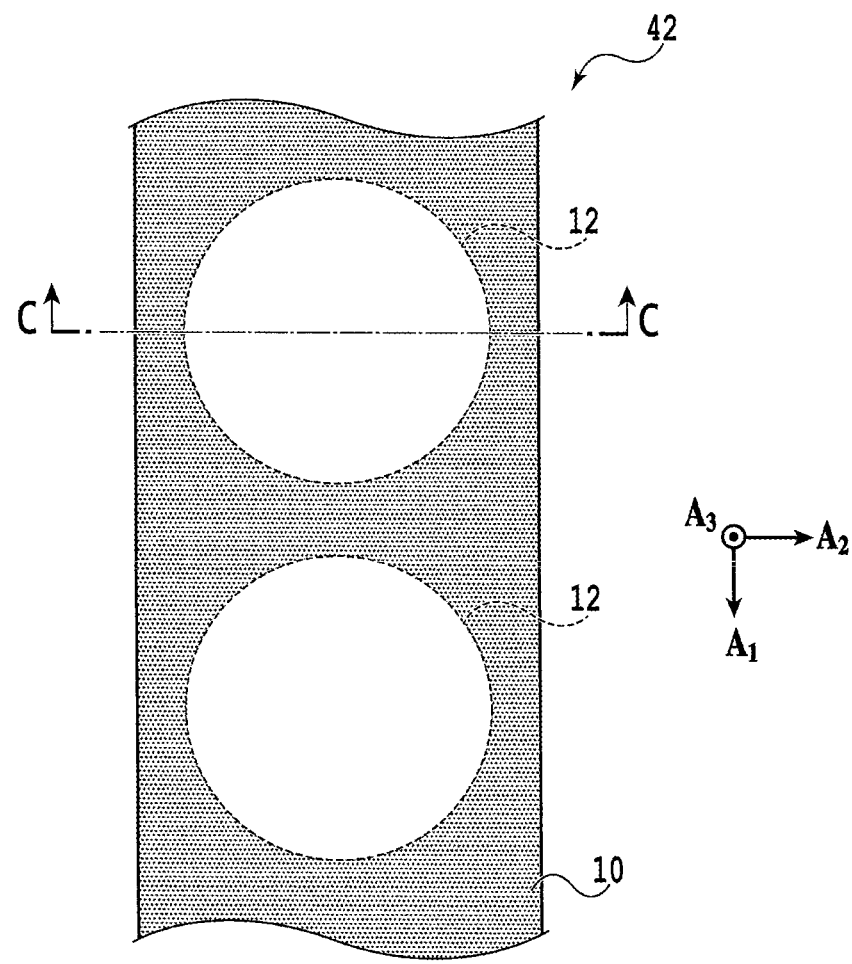
FIG. 6A is a plan view of a resin sheet according to a second embodiment.
Figure 6B:
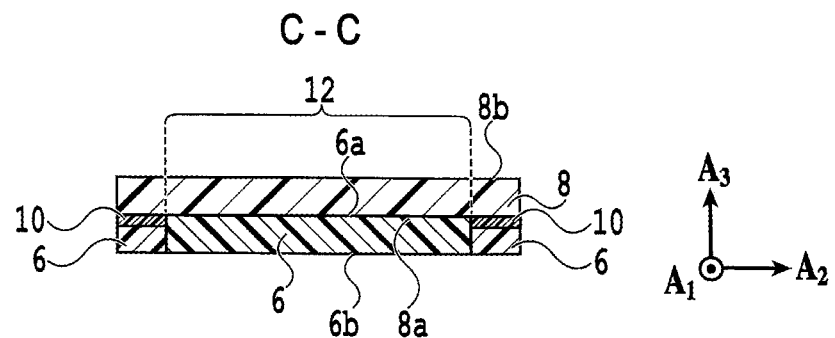
FIG. 6B is a sectional view taken along line C-C of FIG. 6A.

Next, a second embodiment will be described. FIG. 6A is a plan view of a resin sheet 42 according to the second embodiment, and FIG. 6B is a sectional view taken along line C-C of FIG. 6A. In the resin sheet 42, also, as depicted in FIG. 6A, a sticking section 10 is disposed in a region not overlapping with the predetermined region 12 in a plan view. Particularly, the sticking section 10 in the second embodiment is provided on the whole part exclusive of the predetermined region 12 of the inner surface 8a of the protective film 8.

While the predetermined region 12 is a circular region substantially equal in diameter to the workpiece 11, the predetermined region 12 may be larger than the diameter of the workpiece 11 by on the order of 1 mm to 2 mm. When the size of the predetermined region 12 is set larger than the size of the workpiece 11, transfer of the pressure sensitive adhesive to the workpiece 11 can be prevented, even if a positional deviation is generated between the predetermined region 12 and the workpiece 11 at the time of sticking the thermocompression bonding film 6 to the workpiece 11. Note that, since the protective film 8 may be extended slightly by thermocompression bonding, the predetermined region 12 may be smaller than the diameter of the workpiece 11 by on the order of 1 mm to 2 mm.

The sticking section 10 is formed only on the inner surface 8a of the protective film 8 in the second embodiment, but the sticking section 10 may be formed only on the inner surface 6a of the thermocompression bonding film 6. Instead, the sticking section 10 may be formed on each of the inner surface 8a of the protective film 8 and the inner surface 6a of the thermocompression bonding film 6.

The sticking section 10 has the above-mentioned pressure sensitive adhesive. Note that, in FIG. 6A, also, a dot pattern is imparted to the region where the pressure sensitive adhesive is provided, for convenience of explanation. In the second embodiment, as depicted in FIG. 6B, the thermocompression bonding film 6 of the resin sheet 42 is preliminarily cut along a peripheral edge of the predetermined region 12 (in other words, the thermocompression bonding film 6 is preliminarily subjected to a pre-cutting treatment). Hence, when the resin sheet 42 is separated into the thermocompression bonding film 6 and the protective film 8 and the thermocompression bonding film 6 is stuck to the workpiece 11 by thermocompression bonding, a sticking apparatus 40 (see FIG. 7) different from the sticking apparatus 30 is used.

Figure 7:
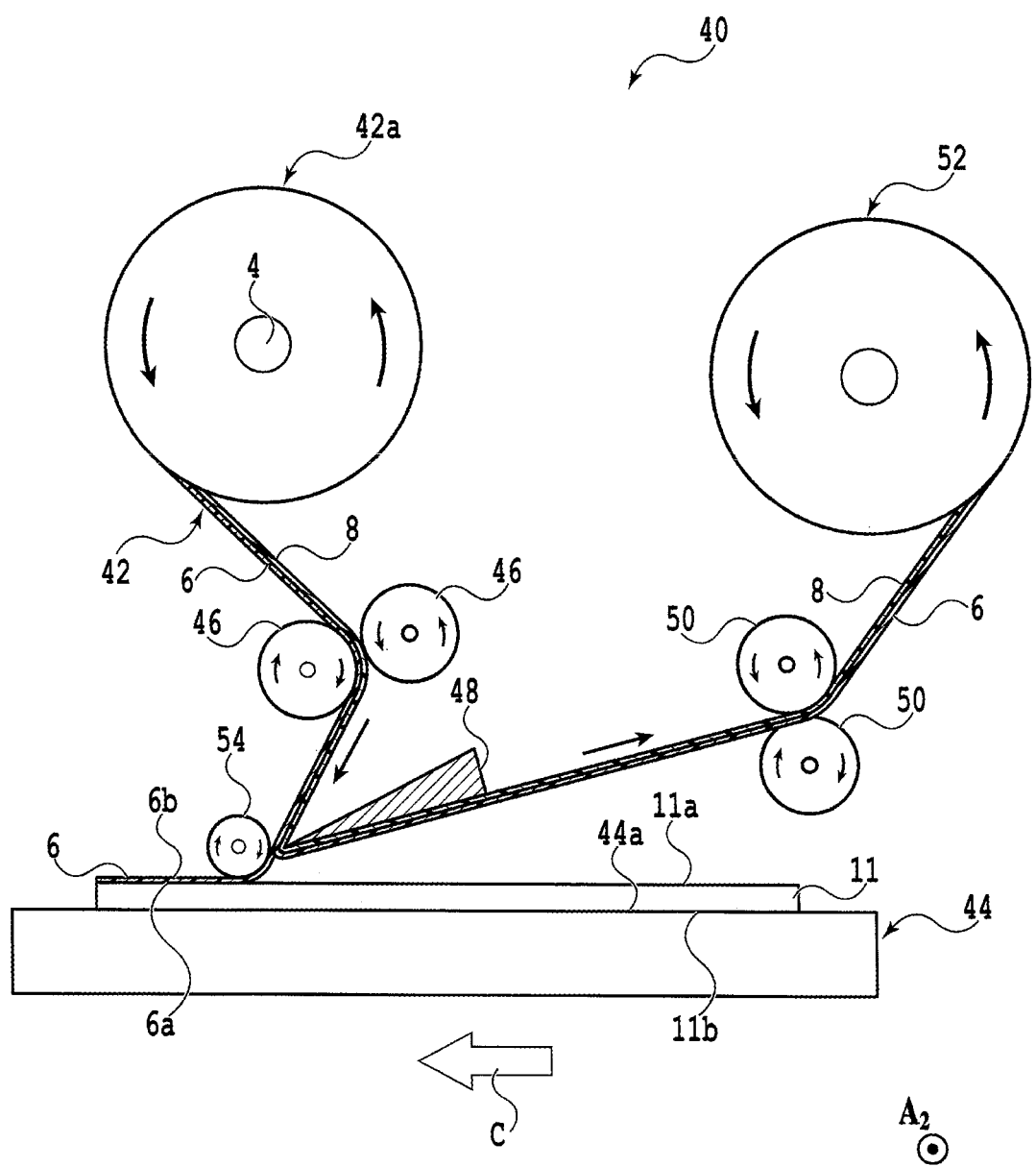
FIG. 7 is a diagram depicting an outline of a sticking step for sticking a thermocompression bonding film to a workpiece.

As depicted in FIG. 7, the sticking apparatus 40 has a disk-shaped chuck table 44. The chuck table 44 has a holding surface 44a on which the workpiece 11 can be held under suction by a negative pressure. The chuck table 44 is configured to be movable in a predetermined direction C by a ball screw type moving mechanism (not illustrated). On the upper side of the holding surface 44a, a wound body 42a of the resin sheet 42 is disposed.

The resin sheet 42 drawn from the wound body 42a is drawn out by a pair of guide rollers 46, after which the circular predetermined region 12 of the thermocompression bonding film 6 is peeled off from the resin sheet 42 by a triangular prism-shaped peeling member 48 making line contact with the resin sheet 42. Note that, in a moving route of the resin sheet 42, between the pair of guide rollers 46 and the peeling member 48, a detection section (not illustrated) for detecting a leading end position of the predetermined region 12 in the moving direction (that is, the longitudinal direction $A_1$) of the resin sheet 42 is provided.

The detection section has, for example, a laser displacement sensor, and detects a variation point of thickness (that is, a stepped position) of the resin sheet 42. Note that the detection section may have, in place of the laser displacement sensor, a color sensor including a light casting section and a light receiving section, and may detect a variation point of color (that is, a boundary position where color changes) of the resin sheet 42 in the longitudinal direction $A_1$.

The resin sheet 42 with the predetermined region 12 of the thermocompression bonding film 6 peeled off therefrom is pulled by a pair of guide rollers 50, and is taken up by a recovery roller 52. In the vicinity of the peeling member 48, a heat roller 54 similar to the above-mentioned heat roller 36 is provided. The heat roller 54 is also configured to be movable in the vertical direction (the direction orthogonal to the width direction $A_2$ and the predetermined direction C in FIG. 7) by a lifting mechanism. In addition, inside the heat roller 54, a heat generation source (not illustrated) such as a heating wire is provided.

FIG. 7 is a diagram depicting an outline of a sticking step of sticking the predetermined region 12 of the thermocompression bonding film 6 to the workpiece 11. The workpiece 11 with the back surface 11b thereof held under suction by the holding surface 44a is disposed in such a manner that the heat roller 54 is located directly above a tip part of the workpiece 11 in the predetermined direction C, with the thermocompression bonding film 6 therebetween.

Next, the heat roller 54 heated to a predetermined temperature is pressed against the front surface 11a side of the workpiece 11 with a predetermined pressure and with the thermocompression bonding film 6 therebetween, and the chuck table 44 is moved in the predetermined direction C. When the heat roller 54 is relatively moved to a position directly above a rear end part of the workpiece 11 in the predetermined direction C, thermocompression bonding of the thermocompression bonding film 6 to the front surface 11*a* is completed.

Since the thermocompression bonding film 6 in the second embodiment is also a polyolefin, the heat roller 54 is heated to a predetermined temperature of 80° C. to 100° C., and the pressure with which the heat roller 54 is pressed against the thermocompression bonding film 6 is set at a predetermined value of 0.3 MPa to 0.5 MPa. In addition, the moving speed of the chuck table 44 is set at a predetermined value of 10 mm/s to 30 mm/s.

In the second embodiment, also, the sticking section 10 is disposed in a region not overlapping, in a plan view, with the predetermined region 12 of the thermocompression bonding film 6, the predetermined region 12 being scheduled to be thermocompression bonded to the workpiece 11. Hence, sticking of the thermocompression bonding film 6 and the protective film 8 to such an extent as to permit peeling can be secured, and transfer of the pressure sensitive adhesive from the thermocompression bonding film 6 or the protective film 8 to the workpiece 11 can be prevented. Note that, in the second embodiment, also, the chuck table 44 in place of the heat roller 54 may be heated to the above-mentioned predetermined temperature, or both the chuck table 44 and the heat roller 54 may be heated to the above-mentioned predetermined temperature.

(Modification)

Figure 8A:
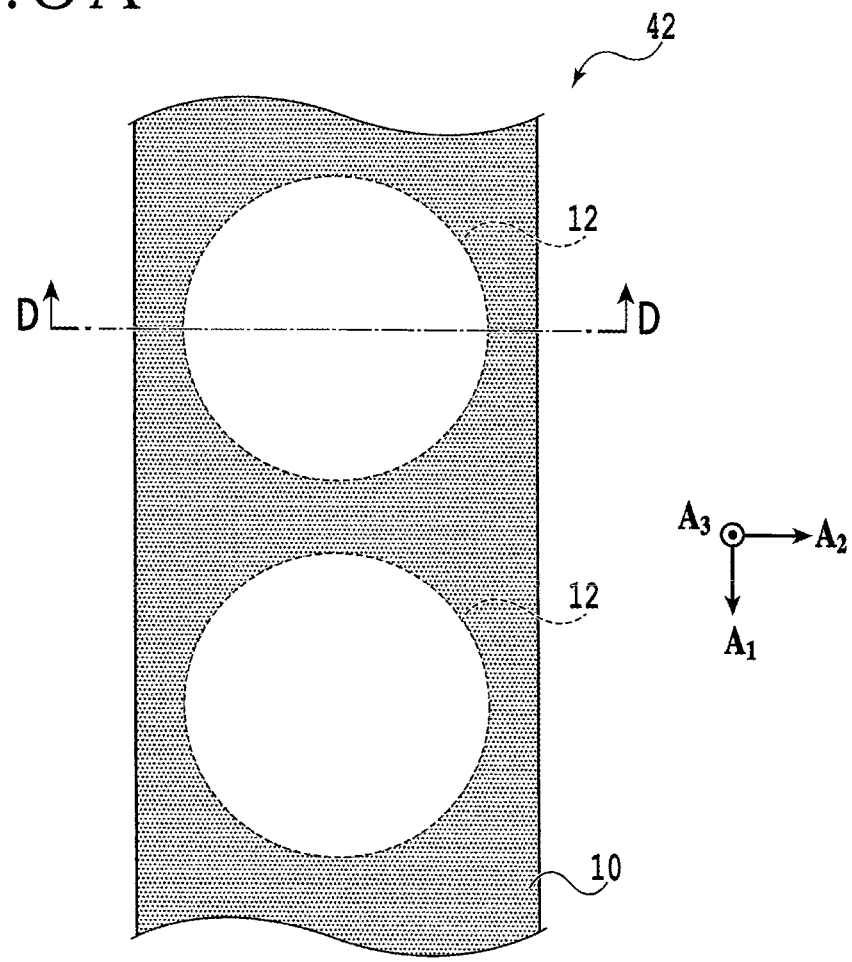
FIG. 8A is a plan view of a resin sheet according to a modification of the second embodiment.
Figure 8B:
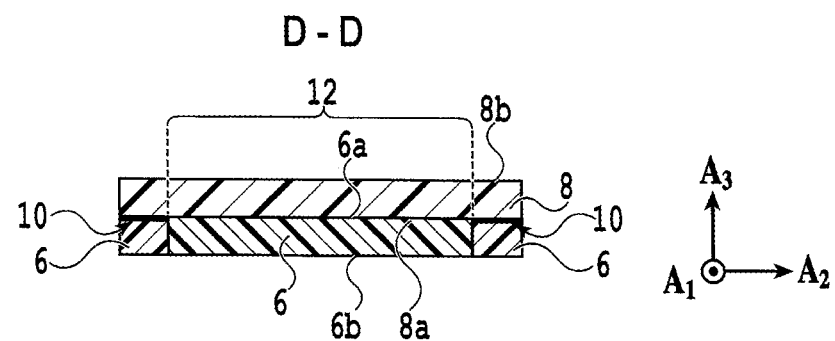
FIG. 8B is a sectional view taken along line D-D of FIG. 8A.

Next, a modification of the second embodiment will be described. FIG. 8A is a plan view of a resin sheet 42 according to the modification of the second embodiment, and FIG. 8B is a sectional view taken along line D-D of FIG. 8A. A sticking section 10 in this modification has a charged region for sticking the thermocompression bonding film 6 and the protective film 8 to each other by an electrostatic force.

The sticking section 10 is formed, for example, only on the inner surface 8*a* of the protective film 8. It is to be noted, however, that the sticking section 10 may be formed only on the inner surface 6*a* of the thermocompression bonding film 6, or may be formed on each of the inner surface 8*a* of the protective film 8 and the inner surface 6*a* of the thermocompression bonding film 6. Incidentally, the sticking section 10 may have a region where the thermocompression bonding film 6 and the protective film 8 are stuck to each other by thermocompression bonding, instead of the charged region. Note that the modification of the second embodiment is the same as the second embodiment except for the configuration of the sticking section 10.

Third Embodiment

Figure 9A:
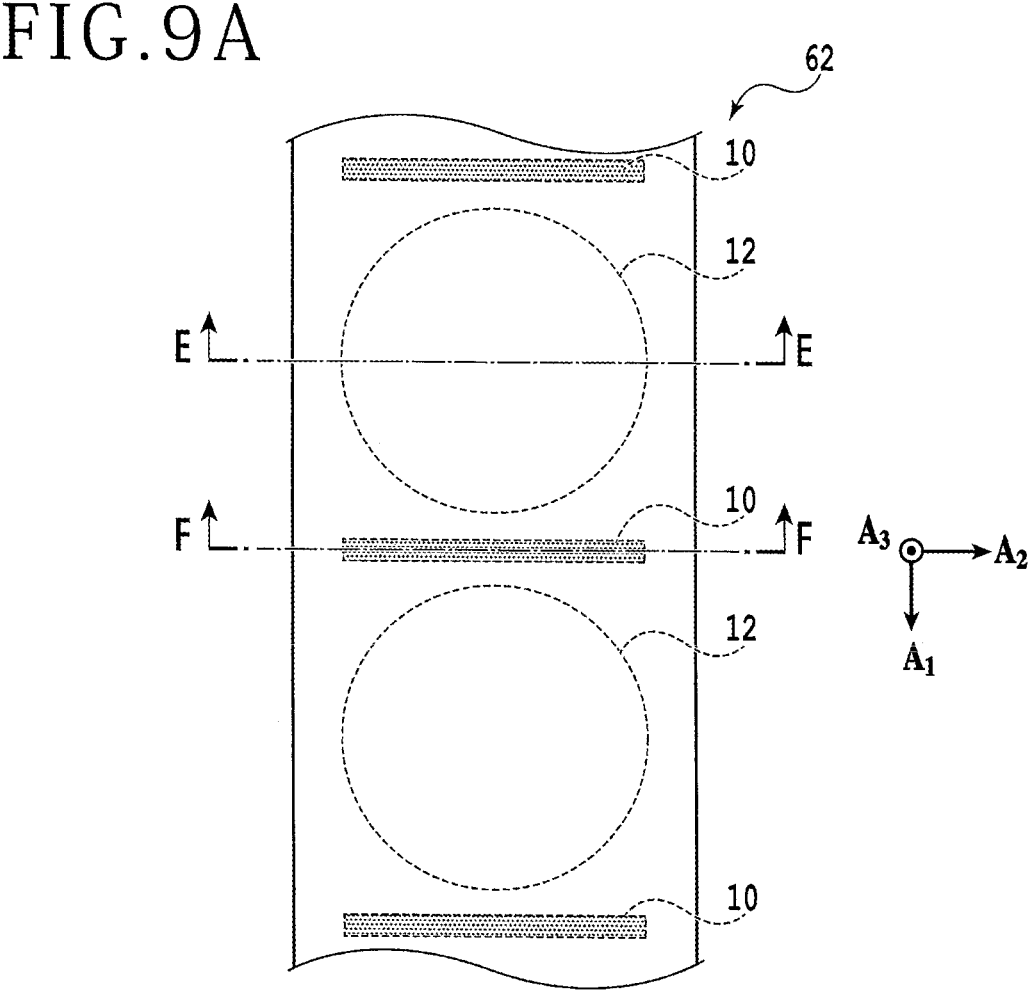
FIG. 9A is a plan view of a resin sheet according to a third embodiment.
Figure 9A:
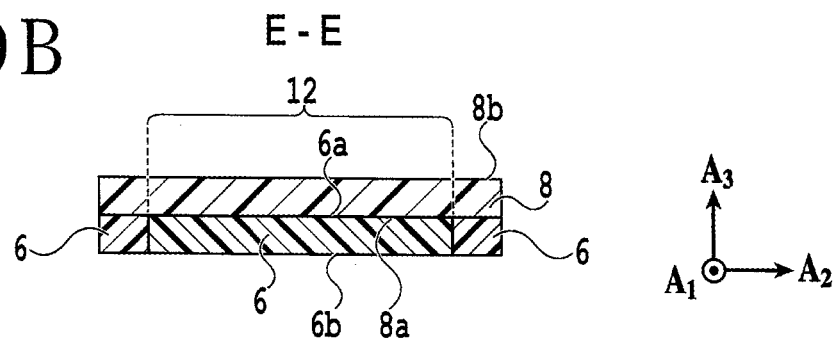
Figure 9A:
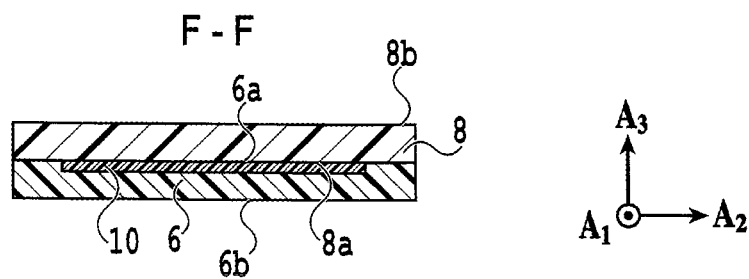

Next, a third embodiment will be described. FIG. 9A is a plan view of a resin sheet 62 according to the third embodiment, FIG. 9B is a sectional view taken along line E-E of FIG. 9A, and FIG. 9C is a sectional view taken along line F-F of FIG. 9A. In the resin sheet 62, also, as depicted in FIG. 9A, a sticking section 10 is disposed in a region not overlapping with the predetermined region 12 in a plan view. Particularly, the sticking section 10 in the third embodiment is disposed between the two predetermined regions 12 of the inner surface 8*a* of the protective film 8.

The sticking section 10 is disposed with its longitudinal direction set along the width direction $A_2$. The length of the sticking section 10 in the width direction $A_2$ is substantially equal to the diameter of the predetermined region 12. Both end parts of the sticking section 10 in the width direction $A_2$ and both end parts of the predetermined region 12 are disposed along the longitudinal direction $A_1$. The sticking section 10 is formed only on the inner surface 8*a* of the protective film 8 in the third embodiment, but the sticking section 10 may be formed only on the inner surface 6*a* of the thermocompression bonding film 6. Instead, the sticking section 10 may be formed on each of the inner surface 8*a* of the protective film 8 and the inner surface 6*a* of the thermocompression bonding film 6.

The sticking section 10 has the above-mentioned pressure sensitive adhesive. Note that, in FIG. 9A, also, a dot pattern is imparted to the region where the pressure sensitive adhesive is provided, for convenience of explanation. As depicted in FIG. 9B, the thermocompression bonding film 6 of the resin sheet 62 is also preliminarily cut along a peripheral edge of the predetermined region 12 (in other words, the thermocompression bonding film 6 is preliminarily subjected to a pre-cutting treatment). The predetermined region 12 is a circular region substantially equal in diameter to the workpiece 11, as in the second embodiment, but the predetermined region 12 may be larger than the diameter of the workpiece 11 by on the order of 1 mm to 2 mm, or may be smaller than the diameter of the workpiece 11 by on the order of 1 mm to 2 mm.

At the time of separating the resin sheet 62 into the thermocompression bonding film 6 and the protective film 8 and sticking the thermocompression bonding film 6 to the workpiece 11 by thermocompression bonding, the above-mentioned sticking apparatus 40 is used. At the time of detecting the leading end position in the moving direction of the predetermined region 12 by the sticking apparatus 40, a laser displacement sensor may be provided as a detection section, and a variation point of thickness of the resin sheet 62 may be detected by utilizing the sticking section 10, or a variation point of color of the resin sheet 62 may be detected.

(Modification)

Figure 10A:
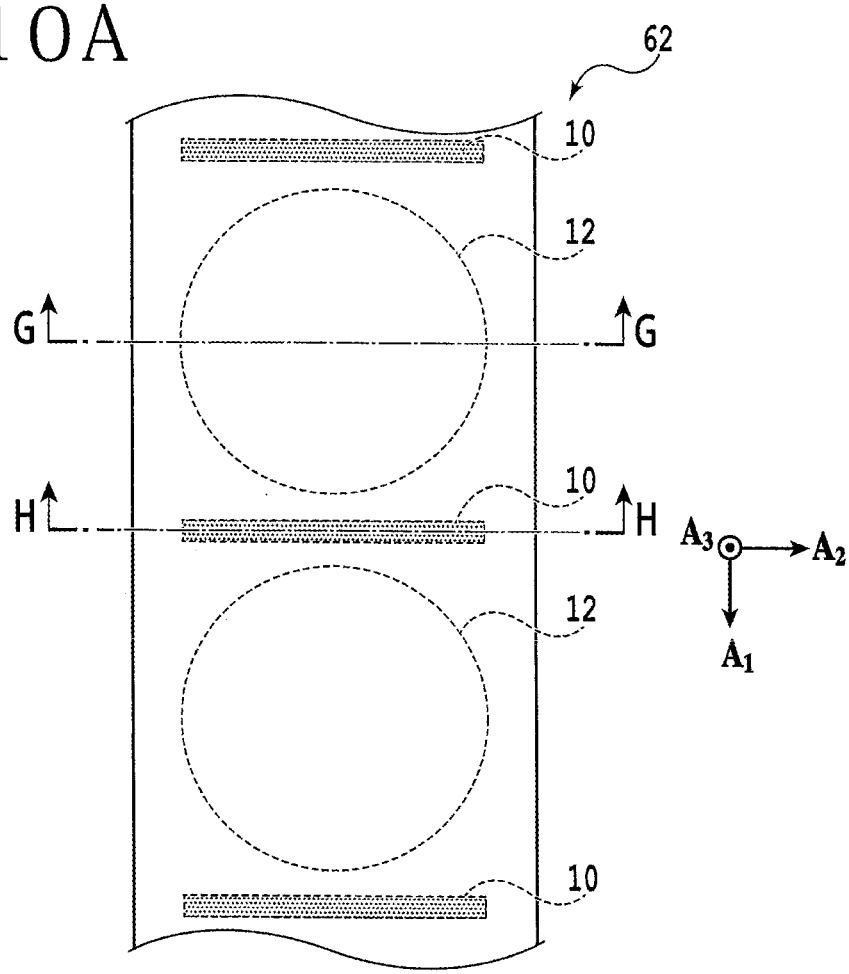
FIG. 10A is a plan view of a resin sheet according to a modification of the third embodiment.
Figure 10A:
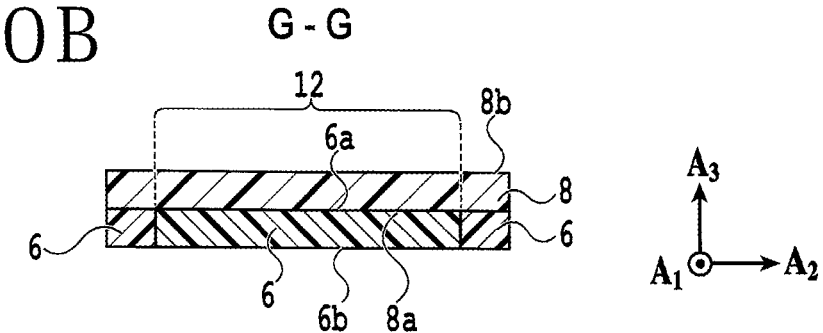
Figure 10A:
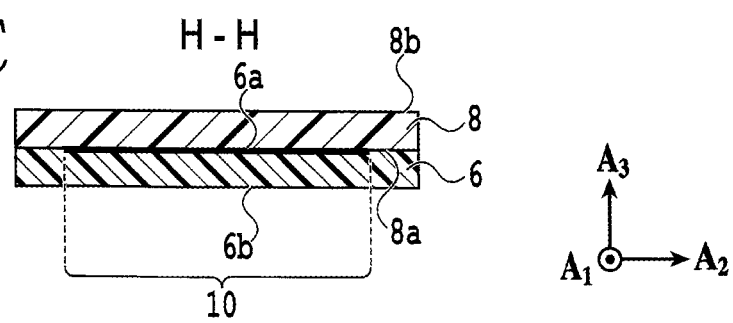

Next, a modification of the third embodiment will be described. FIG. 10A is a plan view of a resin sheet 62 according to the modification of the third embodiment, FIG. 10B is a sectional view taken along line G-G of FIG. 10A, and FIG. 10C is a sectional view taken along line H-H of FIG. 10A. A sticking section 10 in this modification has a charged region for sticking the thermocompression bonding film 6 and the protective film 8 to each other by an electrostatic force.

The sticking section 10 is formed, for example, only on the inner surface 8*a* of the protective film 8. It is to be noted, however, that the sticking section 10 may be formed only on the inner surface 6*a* of the thermocompression bonding film 6, or may be formed on each of the inner surface 8*a* of the protective film 8 and the inner surface 6*a* of the thermocompression bonding film 6. Incidentally, the sticking section 10 may have a region where the thermocompression bonding film 6 and the protective film 8 are stuck to each other by thermocompression bonding, instead of the charged region. Note that the modification of the third embodiment is the same as the third embodiment except for the configuration of the sticking section 10.

Other than the above points, the structures, methods, and the like concerning the above-described embodiments can appropriately be modified in carrying out the present invention insofar as the modifications do not depart from the scope of the object of the invention. The thermocompression bonding film 6 may be stuck to the back surface 11*b* of the workpiece 11, in place of the front surface 11*a*. In addition, the sizes of the resin sheets 2, 42, and 62 are merely examples. The shape and size of the predetermined region 12 may be modified as required, according to the shape and size of the workpiece 11. The workpiece 11 may have a rectangular plate-like shape, instead of the disk-like shape.

In the resin sheet 2 in the first embodiment, also, as in the second and third embodiments, the predetermined region 12 may be preliminarily cut along a peripheral edge thereof (in other words, the predetermined region 12 may be preliminarily subjected to a pre-cutting treatment). In the resin sheets 2, 42, and 62 preliminarily subjected to the pre-cutting treatment, a predetermined color serving as a marker may be imparted to the leading end position of the predetermined region 12 such that it is easy to detect the leading end position of the predetermined region 12 in the moving direction of the resin sheet 2, 42, or 62. In addition, in the second and third embodiments, as in the first embodiment, the pre-cutting treatment may not be conducted, the predetermined region 12 having a diameter larger than the workpiece 11 by several tens of millimeters (for example, 30 mm) may be stuck to the workpiece 11, and thereafter, the thermocompression bonding film 6 may be cut off.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A resin sheet having a thermocompression bonding film that is to be thermocompression bonded to a workpiece, the resin sheet comprising:
   the thermocompression bonding film that is made of resin and has one surface which is to be thermocompression bonded to the workpiece; and
   a resin-made protective film that has an inner surface facing the one surface, is stuck to the thermocompression bonding film in a peelable manner, and protects the one surface,
   wherein at least one of the one surface or the inner surface is provided with a sticking section for sticking the thermocompression bonding film and the protective film to each other, and
   the sticking section is disposed in a region not overlapping, in a plan view, with a predetermined region of the one surface, the predetermined region being scheduled to be thermocompression bonded to the workpiece.

2. The resin sheet according to claim 1, wherein the resin sheet is elongate, and the sticking section is disposed at each of both end parts in a width direction orthogonal to a longitudinal direction of the resin sheet.

3. The resin sheet according to claim 1, wherein the resin sheet is elongate, and is in a mode of being a wound body wound in multiple plies around a cylindrical core.

4. The resin sheet according to claim 1, wherein the sticking section has a pressure sensitive adhesive.

5. The resin sheet according to claim 1, wherein the sticking section has a charged region for sticking the thermocompression bonding film and the protective film to each other by an electrostatic force.

6. The resin sheet according to claim 1, wherein the sticking section has a region where the thermocompression bonding film and the protective film are stuck to each other by thermocompression bonding.

* * * * *